(12) United States Patent
Felix Frias

(10) Patent No.: US 10,422,174 B2
(45) Date of Patent: Sep. 24, 2019

(54) LIFTGATE ASSEMBLY

(71) Applicant: FORD GLOBAL TECHNOLOGIES, LLC, Dearborn, MI (US)

(72) Inventor: Carlos Humberto Felix Frias, Mexico (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 136 days.

(21) Appl. No.: 15/485,015

(22) Filed: Apr. 11, 2017

(65) Prior Publication Data
US 2018/0291664 A1 Oct. 11, 2018

(51) Int. Cl.
| | |
|---|---|
| *E05F 1/12* | (2006.01) |
| *E05F 1/14* | (2006.01) |
| *F16C 19/50* | (2006.01) |
| *F16C 19/55* | (2006.01) |
| *B60J 1/00* | (2006.01) |
| *B60J 1/18* | (2006.01) |
| *B60J 5/10* | (2006.01) |
| *E05D 15/48* | (2006.01) |
| *E05F 1/10* | (2006.01) |

(52) U.S. Cl.
CPC ................ *E05F 1/12* (2013.01); *B60J 1/004* (2013.01); *B60J 1/1884* (2013.01); *B60J 5/101* (2013.01); *E05D 15/48* (2013.01); *E05F 1/1091* (2013.01); *E05F 1/1215* (2013.01); *E05F 1/1292* (2013.01); *E05F 1/14* (2013.01); *F16C 19/502* (2013.01); *F16C 19/55* (2013.01); *E05Y 2900/546* (2013.01)

(58) Field of Classification Search
CPC ... E05F 1/12; E05F 1/1292; E05F 1/14; B60J 5/101
USPC ................... 49/339, 340, 344, 345
See application file for complete search history.

(56) References Cited

U.S. PATENT DOCUMENTS

| | | | | |
|---|---|---|---|---|
| 1,494,695 | A | * 5/1924 | McCluskey | F16C 19/55 384/461 |
| 1,742,841 | A | * 1/1930 | Witthofft | F16C 19/55 384/461 |
| 4,664,437 | A | * 5/1987 | Queveau | B60J 5/101 296/106 |
| 4,854,076 | A | * 8/1989 | Sieben | B65D 90/10 49/280 |
| 6,234,564 | B1 | 5/2001 | Kim | |
| 6,601,903 | B2 * | 8/2003 | Nakagome | B62D 25/12 296/76 |
| 6,607,231 | B2 | 8/2003 | Paiva et al. | |
| 7,011,357 | B2 | 3/2006 | Seksaria et al. | |

(Continued)

FOREIGN PATENT DOCUMENTS

| | | | |
|---|---|---|---|
| CN | 103938995 | 7/2014 | |
| EP | 1780063 A1 * | 5/2007 | B60J 5/101 |
| KR | 100410819 B1 | 12/2003 | |

*Primary Examiner* — Marcus Menezes
(74) *Attorney, Agent, or Firm* — Carlson, Gaskey & Olds, P.C.

(57) ABSTRACT

A vehicle liftgate assembly according to an exemplary aspect of the present disclosure includes, among other things, a vehicle body, a liftgate bracket, a liftgate rotatably mounted to the vehicle body by way of the liftgate bracket, and a strut connected to the liftgate bracket to regulate rotational movement of the liftgate bracket. This disclosure also relates to a method and a rotation assembly, which may include a liftgate bracket and a flipglass bracket.

13 Claims, 6 Drawing Sheets

(56) References Cited

U.S. PATENT DOCUMENTS

| | | | | |
|---|---|---|---|---|
| 7,293,819 B2* | 11/2007 | Duffy | ................ | E05F 15/63 |
| | | | | 296/146.4 |
| 7,441,827 B2* | 10/2008 | Bonneau | ............ | B62D 25/087 |
| | | | | 296/146.11 |
| 7,445,267 B2* | 11/2008 | Charon | ............ | E05F 1/1292 |
| | | | | 296/146.1 |
| 7,673,928 B2* | 3/2010 | Walker | ............ | B60J 5/101 |
| | | | | 296/146.11 |
| 8,123,277 B2* | 2/2012 | Aldersley | ............ | B60J 5/107 |
| | | | | 296/146.8 |
| 8,943,749 B2* | 2/2015 | Song | ............ | B60J 5/0491 |
| | | | | 296/24.43 |
| 9,222,296 B2* | 12/2015 | Hamminga | ............ | E05F 15/41 |
| 2004/0090083 A1* | 5/2004 | Greuel | ............ | G05B 19/416 |
| | | | | 296/146.4 |
| 2005/0155289 A1* | 7/2005 | Oberheide | ............ | E05F 1/1091 |
| | | | | 49/340 |
| 2007/0261310 A1* | 11/2007 | Porat | ............ | E05F 1/1091 |
| | | | | 49/340 |
| 2009/0184533 A1* | 7/2009 | Townson | ............ | E05F 1/1292 |
| | | | | 296/57.1 |

\* cited by examiner

US 10,422,174 B2

LIFTGATE ASSEMBLY

BACKGROUND

This disclosure relates to a liftgate assembly used to open and close an opening in a rear portion of a vehicle body.

Minivans, sport utility vehicles (SUVs), hatchbacks, and other vehicles have an opening defined in a rear portion of the vehicle's body. Ordinarily, these vehicles include liftgates that are used to selectively open and close the opening in the rear portion of the vehicle. Some liftgates include a flipglass window, which can be opened and closed independent of the liftgate to selectively expose a portion of the opening. Some liftgates are powered liftgates, which are opened and closed by an automated system. Other liftgates are manually opened and closed by a user.

Some known liftgate assemblies include a pair of liftgate struts mounted between the liftgate and the vehicle's body. These struts, which may be pneumatic struts such as gas springs, regulate movement of the liftgate as the liftgate opens and closes. When the liftgate includes a flipglass window, the liftgate includes another pair of struts connected to the flipglass window. In total, these known liftgate assemblies include four struts regulating movement of the liftgate and the flipglass window.

SUMMARY

A vehicle liftgate assembly according to an exemplary aspect of the present disclosure includes, among other things, a vehicle body, a liftgate bracket, a liftgate rotatably mounted to the vehicle body by way of the liftgate bracket, and a strut connected to the liftgate bracket to regulate rotational movement of the liftgate bracket.

In a further non-limiting embodiment of the foregoing assembly, the liftgate bracket includes a bearing rotatable about a shaft, the bearing including a ring provided within a housing and disposed about the shaft, the ring being rotatable relative to the housing and the shaft.

In a further non-limiting embodiment of any of the foregoing assemblies, the strut is connected to an outer face of the ring.

In a further non-limiting embodiment of any of the foregoing assemblies, the liftgate bracket includes a first bearing bed and a second bearing bed, the first bearing bed provided between the ring and the housing, and the second bearing bed provided between the ring and the shaft.

In a further non-limiting embodiment of any of the foregoing assemblies, the liftgate bracket includes a bracket arm projecting from the ring, and the bracket arm is connected to the liftgate.

In a further non-limiting embodiment of any of the foregoing assemblies, the housing includes an opening, the bracket arm projecting through the opening.

In a further non-limiting embodiment of any of the foregoing assemblies, the housing includes a first stop and a second stop, the first and second stops are provided on opposite sides of the opening, the bracket arm abuts the first stop when the liftgate is in a fully open position, and the bracket arm abuts the second stop when the liftgate is in a closed position.

In a further non-limiting embodiment of any of the foregoing assemblies, the liftgate includes a flipglass window, the liftgate assembly further comprises a flipglass bracket connected to the flipglass window, and the flipglass bracket is rotatably mounted about the shaft.

In a further non-limiting embodiment of any of the foregoing assemblies, the assembly further includes a torsion spring disposed about the shaft and connected to the flipglass bracket, and the torsion spring regulates rotation of the flipglass bracket.

In a further non-limiting embodiment of any of the foregoing assemblies, the liftgate bracket is a first liftgate bracket and the flipglass bracket is a first flipglass bracket, the first liftgate bracket and the first flipglass bracket provide a first rotation assembly, and the liftgate assembly includes a second rotation assembly having a second liftgate bracket and a second flipglass bracket rotatably connected to the liftgate and the flipglass window, respectively.

In a further non-limiting embodiment of any of the foregoing assemblies, the second liftgate bracket and the second flipglass bracket are rotatably mounted about a second shaft.

In a further non-limiting embodiment of any of the foregoing assemblies, a second strut is connected to the second liftgate bracket to regulate rotational movement of the second liftgate bracket.

In a further non-limiting embodiment of any of the foregoing assemblies, the shaft is connected to a vehicle body by a mount at a first end of the shaft.

In a further non-limiting embodiment of any of the foregoing assemblies, the strut is mounted substantially within a vehicle body such that the strut is substantially not visible from a vehicle exterior.

In a further non-limiting embodiment of any of the foregoing assemblies, the liftgate is a liftgate of a sport utility vehicle (SUV).

A method according to an exemplary aspect of the present disclosure includes, among other things, rotating a liftgate relative to a vehicle body by way of a liftgate bracket. Further, in the method, rotation of the liftgate is regulated by a strut connected to the liftgate bracket.

In a further non-limiting embodiment of the foregoing method, the method includes rotating a flipglass window relative to the liftgate by way of a flipglass bracket. Further, rotation of the flipglass window is regulated by a torsion spring connected to the flipglass bracket.

In a further non-limiting embodiment of any of the foregoing methods, the liftgate bracket includes a ring provided between a housing and a shaft.

In a further non-limiting embodiment of any of the foregoing methods, the liftgate bracket and the flipglass bracket are both rotatable about the shaft.

A rotation assembly for regulating rotational movement of a liftgate having a flipglass window according to an exemplary aspect of the present disclosure includes, among other things, a shaft and a liftgate bracket connected to the liftgate and rotatably mounted about the shaft. Further, rotation of the liftgate bracket is regulated by a strut connected to the liftgate bracket. The rotation assembly also includes a flipglass bracket connected to the flipglass window and rotatably mounted about the shaft. Rotation of the flipglass bracket is regulated by a torsion spring.

DETAILED DESCRIPTION

This disclosure relates to a liftgate assembly for regulating rotational movement of a liftgate of a motor vehicle. One example liftgate assembly includes a liftgate bracket, which is rotatably connected to a liftgate. A strut, such as a pneumatic strut, is connected to the liftgate bracket to regulate rotational movement of the liftgate bracket, and in turn the liftgate. Since the strut is connected to the liftgate bracket as opposed to the liftgate, a relatively short strut can be used. Further, since the strut is relatively short and is not connected directly to the liftgate, the strut can be provided within a vehicle body. As such, the strut is substantially blocked from view from a vehicle exterior.

In addition to the liftgate bracket, the disclosed liftgate assembly may also include a flipglass bracket, which in one example is rotatably mounted about a common shaft with the liftgate bracket. A torsion spring regulates rotation of the flipglass bracket, and in turn a flipglass window, without the use of struts. Thus, the liftgate assembly of this disclosure does not require struts connected to the flipglass window.

Figure 1:
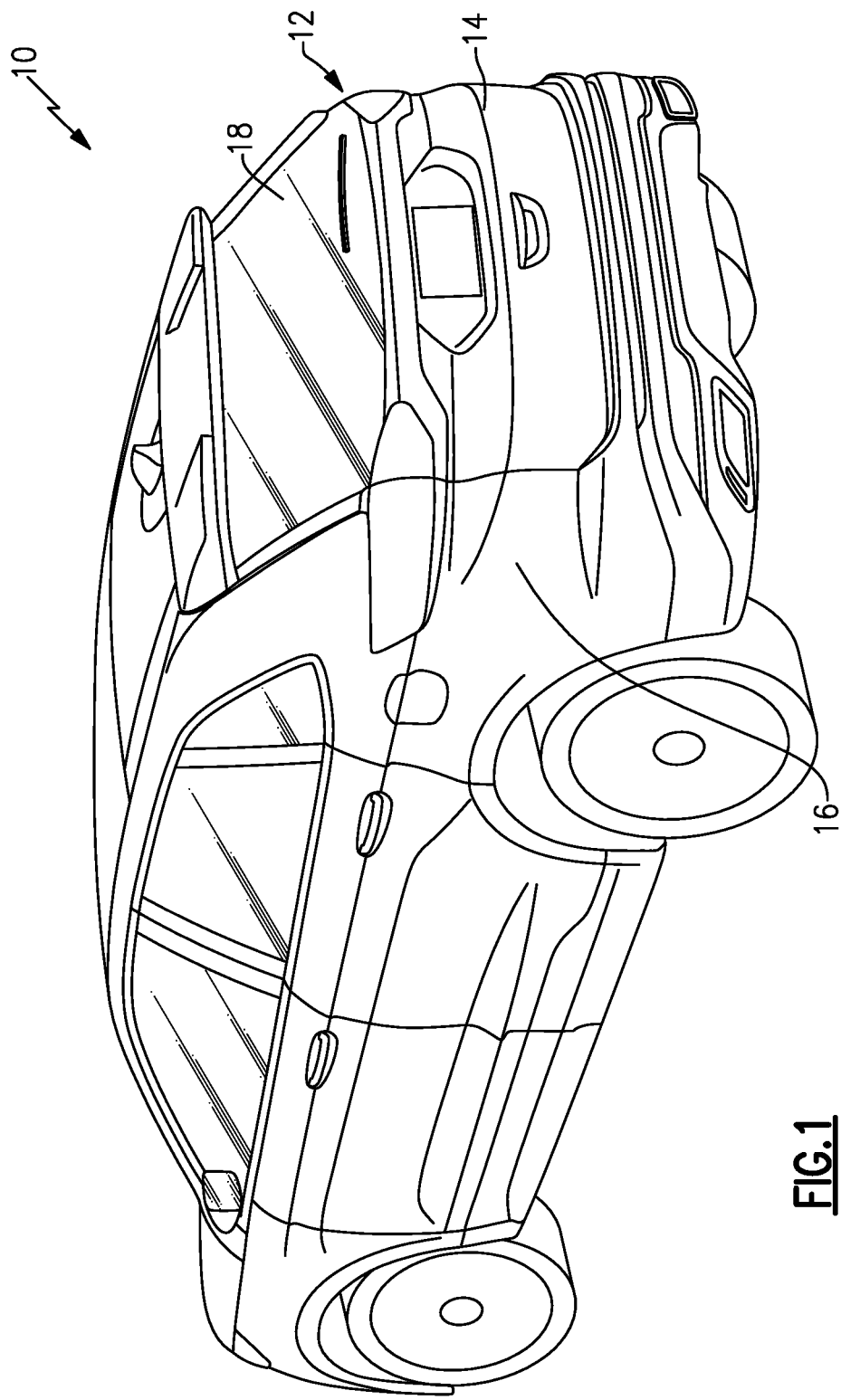
FIG. 1 is a rear-perspective view of a motor vehicle with an example liftgate. In this example, the liftgate includes a flipglass window.

Referring to the drawings, FIG. 1 is a rear-perspective view of a motor vehicle 10, which is shown as a sport utility vehicle (SUV), including an example liftgate assembly 12. While FIG. 1 shows an SUV, this disclosure is not limited to SUVs and extends to other vehicles, including minivans and hatchbacks.

In this example, the liftgate assembly 12 includes a liftgate 14 rotatable between a fully open position and a closed position to selectively open and close (respectively) an opening defined in a rear of a vehicle body 16. The liftgate 14 is pivotally mounted to the vehicle body 16 near an upper edge of the liftgate 14. As used in this disclosure, the vehicle body 16 refers to the frame (including pillars) and paneling of the vehicle 10.

The liftgate assembly 12 also includes a flipglass window 18 in this example. The flipglass window 18 is rotatable between a fully open and closed position to selectively expose a portion of the opening defined in the rear of the vehicle body 16. The flipglass window 18 is rotatable relative to the liftgate 14, such that the flipglass window 18 can be opened while the liftgate 14 remains closed. Like the liftgate 14, the flipglass window 18 is pivotally mounted to the vehicle body 16 near an upper edge of the flipglass window 18. While a flipglass window 18 is shown in FIG. 1, it should be understood that this disclosure extends to liftgate assemblies that may not include flipglass windows.

Figure 2:
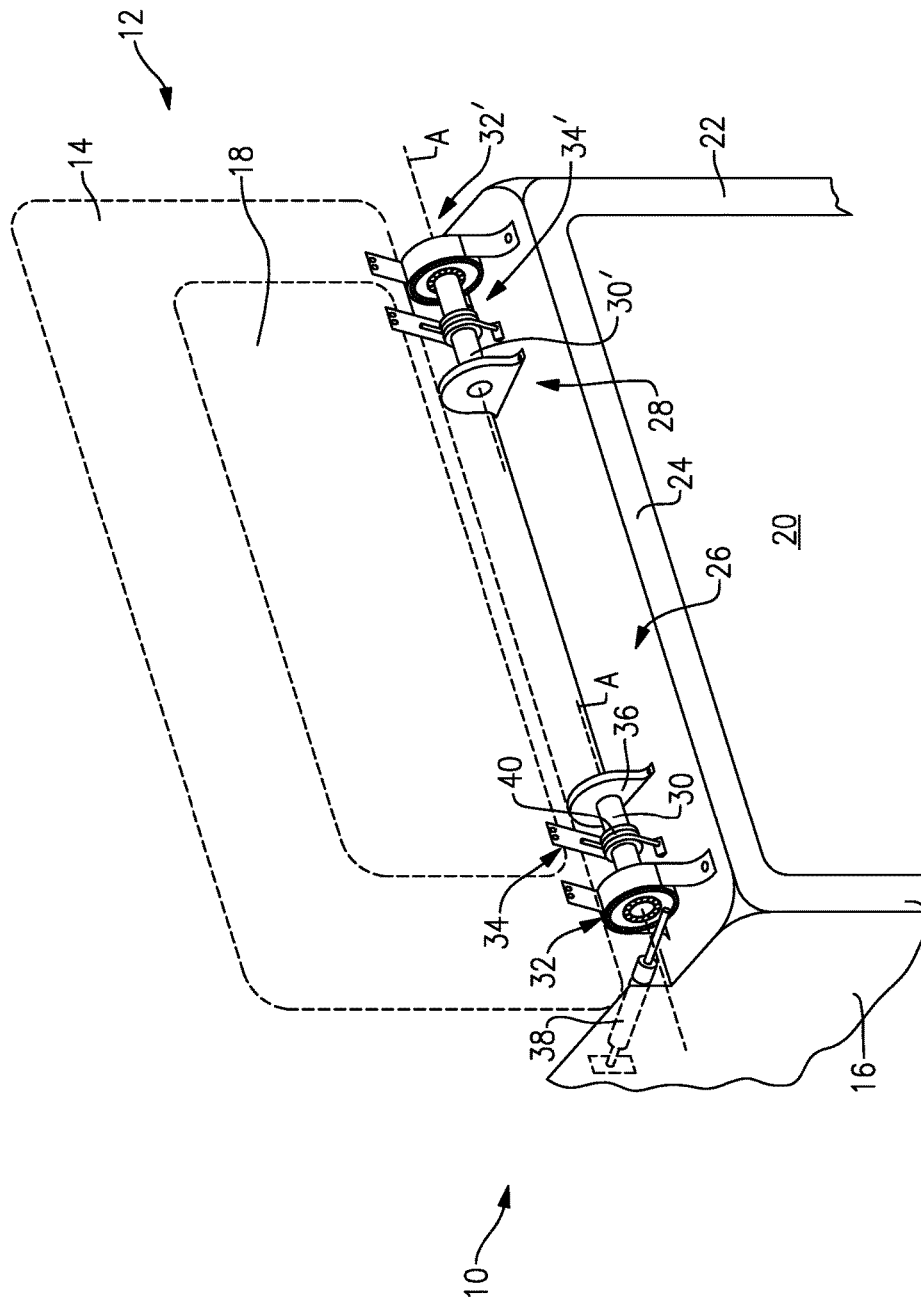
FIG. 2 schematically illustrates an example liftgate assembly including first and second rotation assemblies.

FIG. 2 schematically shows a portion of the rear of the vehicle 10. In FIG. 2, the liftgate assembly 12 is in a fully open position, such that an opening 20 in a rear of the vehicle 10 is exposed. In this example, the opening 20 is bound by the vehicle body 16. In particular, the opening 20 is bound laterally by spaced-apart vertical pillars 22. The vertical pillars 22 may be "D-pillars" of the vehicle 10, for example. The opening 20 is bound vertically by a horizontal frame member 24, which spans between the vertical pillars 22. The horizontal frame member 24 may be a roof of the vehicle 10.

In this example, the liftgate assembly 12 is rotatably connected to the horizontal frame member 24 by a first rotation assembly 26 and a second rotation assembly 28. The liftgate assembly 12 is rotatable, via the first and second rotation assemblies 26, 28, about an axis A relative to the vehicle body 16 to selectively open and close the opening 20. The first and second rotation assemblies 26, 28 are laterally spaced-apart from one another along the axis A. Further, it should be understood that FIG. 2 shows the liftgate assembly 12 in an exaggerated position for purposes of illustration only, as one skilled in the art would readily appreciate.

The detail of the first and second rotation assemblies 26, 28 will now be described. To avoid redundancy, the first rotation assembly 26 will be described in detail, and it should be understood that the second rotation assembly 28 is arranged in substantially the same manner as the first rotation assembly 26. In the illustrated example, the second rotation assembly 28 is essentially a mirror image of the first rotation assembly 26. In another example, the first and second rotation assemblies 26, 28 are identical.

With continued reference to FIG. 2, the first rotation assembly 26 includes a shaft 30, a liftgate bracket 32, and a flipglass bracket 34. The shaft 30 extends along the axis A and is connected to the horizontal frame member 24 by a shaft mount 36. The shaft mount 36 may be connected to the horizontal frame member 24 by way of fasteners or a welded connection, as examples. The shaft mount 36 supports the shaft 30 such that the shaft 30 is rotatably fixed. The liftgate bracket 32 and the flipglass bracket 34 are rotatable about the shaft 30.

The liftgate bracket 32 is connected to the liftgate 14 and is rotatably mounted about the shaft 30. Further, in this example, rotation of the liftgate bracket 32 is regulated by a strut 38. The strut 38 is connected to the liftgate bracket 32 at one end and to the vehicle body 16 at another end. The strut 38 may be a pneumatic strut, such as gas spring strut, configured to urge the liftgate 14 toward the fully open position after the liftgate 14 is raised to an intermediate height between the closed and fully open positions.

In this example, the strut 38 is connected directly to the liftgate bracket 32, as opposed to being connected directly to the liftgate 14. As such, the strut 38 does not travel with the liftgate 14 as the liftgate 14 opens and closes, as it would if the strut were mounted directly to the liftgate 14. The length of the strut 38 is also relatively short compared to struts that are connected directly to a liftgate. Since the strut 38 has a relatively short length and is connected to the liftgate bracket 32, the strut 38 can be mounted substantially within a vehicle body 16 such that the strut 38 is not visible from the exterior of the vehicle 10 when the liftgate 14 is in the fully open position. In some examples, the strut 38 is not visible at all from an exterior of the vehicle 10. Such an arrangement increases the aesthetic appeal of the liftgate assembly 12.

The flipglass bracket 34 is connected to the flipglass window 18 and is rotatably mounted about the shaft 30. Rotation of the flipglass bracket 34 is regulated by a torsion spring 40 in this example. In this disclosure, there are no struts connected directly to the flipglass window 18 or the flipglass bracket 34. Rather, rotation of the flipglass window 18 is regulated entirely by the flipglass bracket 34 and the torsion spring 40. Since the liftgate assembly 12 does not include struts connected directly to the liftgate 14 or the flipglass window 18, manufacturing costs and assembly time are reduced. The lacks of flipglass struts also contributes to the overall aesthetic appeal of the liftgate assembly 12.

Figure 3:
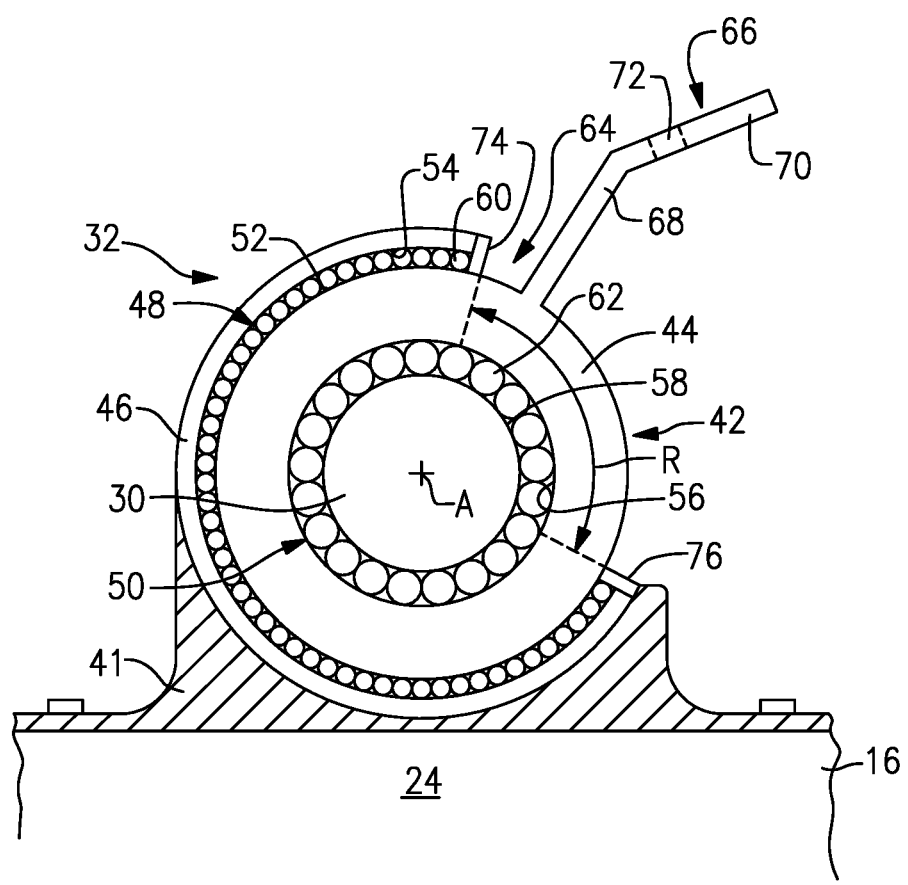
FIG. 3 is a side view of an example liftgate bracket.

FIG. 3 is a side view illustrating the detail of the liftgate bracket 32. The strut 38 is not illustrated in FIG. 3 for ease of reference. The liftgate bracket 32 is mounted to the vehicle body 16 by way of a mount 41. As shown, the mount 41 is connected to the horizontal frame member 24 by a plurality of fasteners, although the mount 41 could be welded to the horizontal frame member 24. Alternatively, the horizontal frame member 24 could be integrally formed with the mount 41.

Figure 4:
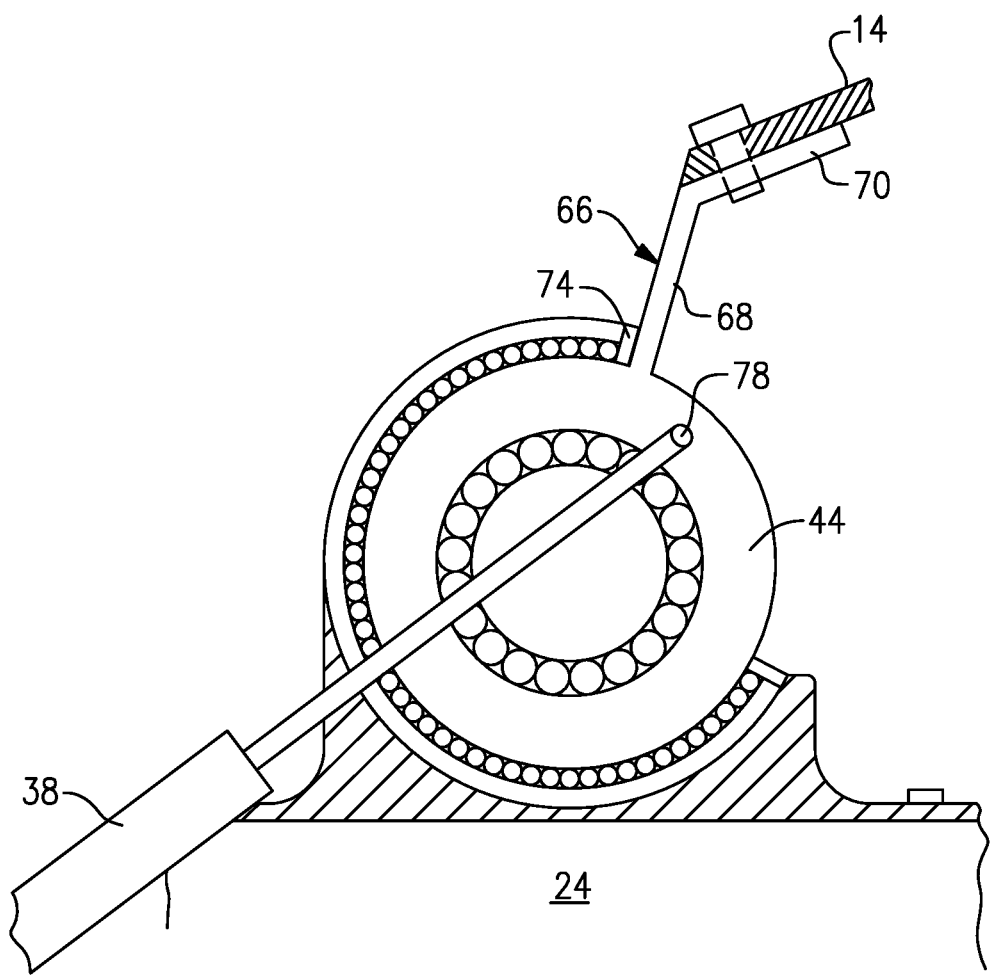
FIG. 4 is a side view of the example liftgate bracket of FIG. 3, and illustrates the liftgate bracket when the liftgate is in a fully open position.
Figure 5:
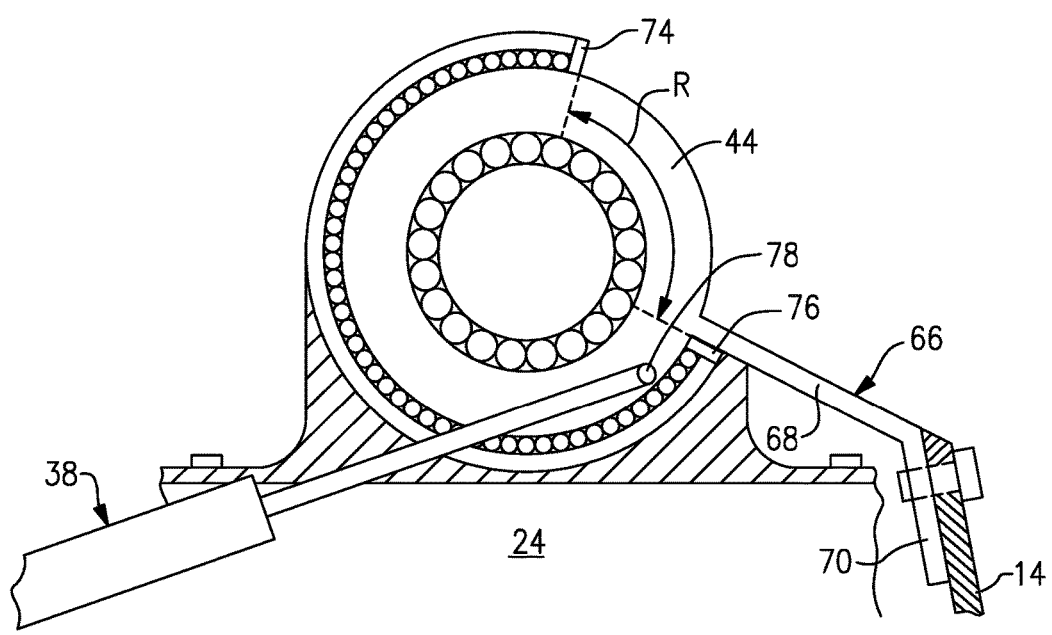
FIG. 5 is a side view of the example liftgate bracket of FIG. 3, and illustrates the liftgate bracket when the liftgate is in a closed position.

The liftgate bracket 32 includes a bearing 42 rotatable about the shaft 30. The bearing 42 in this example is a "double" bearing, meaning it has an inner and outer bearing bed. Other types of bearings come within the scope of this disclosure, however. The example bearing 42 includes a ring 44 provided within a housing 46 and disposed about the shaft 30. As shown in FIGS. 4-5, the strut 38 is connected to an outer face of the ring 44 at attachment point 78, in one example.

In this example, the ring 44 is rotatable relative to both the housing 46 and the shaft 30. As such, the bearing 42 includes a first bearing bed 48 and a second bearing bed 50. The first bearing bed 48 is provided between an outer surface 52 of the ring 44 and an inner surface 54 of the housing 46. The surfaces 52, 54 serve as races for the first bearing bed 48. The second bearing bed 50 is provided between an inner surface 56 of the ring 44 and an outer surface 58 of the shaft 30. The surfaces 56, 58 serve as races for the second bearing bed 50.

The first and second bearing beds 48, 50 are provided with a plurality of rolling elements 60, 62, such as ball bearings. In FIG. 3, the rolling elements 60 within the first bearing bed 48 have a smaller diameter than the rolling elements 62 in the second bearing bed 50, however it should be understood that the rolling elements 60, 62 could be any size. Further, it should be understood that the disclosed arrangement of the liftgate bracket 32 provides radial support for the shaft 30 at an end opposite the shaft mount 36.

In this example, the first bearing bed 48 does not extend around the entirety of the circumference of the ring 44. Rather, the housing 46 includes an opening 64 interrupting the first bearing bed 48. Further, the liftgate bracket 32 includes a bracket arm 66 projecting from the ring 44, through the opening 64, and radially beyond the housing 46. The bracket arm 66 is connectable to the liftgate 14, as shown in FIGS. 4-5. In this example, the bracket arm 66 has a first portion 68 projecting substantially perpendicularly from an outer surface of the ring 44, and a second portion 70 inclined relative to the first portion 68. In this example, the second portion 70 includes apertures 72 configured to receive fasteners that couple the liftgate 14 to the bracket arm 66. The liftgate 14 could be connected to the bracket arm 66 using other known attachment methods, however.

In this example, the bracket arm 66 is rotatable about the axis A within a rotational range of movement R. The limits of the range of movement R are set, in this example, by the relationship between the housing 46 and the bracket arm 66. In this example, the range of movement R is about 120 degrees about the axis A. This disclosure is not limited to one particular range of movement, however. Rather, the range of movement R corresponds to a desired level of movement of the liftgate 14, which can vary in different applications.

The housing 46 includes a first stop 74 and a second stop 76 on opposite sides of the opening 64. The first and second stops 74, 76 provide boundaries for the rolling elements 60 within the first bearing bed 48, and are further configured to abut the bracket arm 66 when the liftgate 14 is in the fully open (FIG. 4) and closed (FIG. 5) positions, respectively.

FIG. 4 illustrates the liftgate bracket 32 when the liftgate 14 is in the fully open position. FIG. 4 also illustrates the strut 38 connected to the ring 44 at an attachment point 78, and further illustrates the liftgate 14 connected to the second portion 70 of the bracket arm 66. In FIG. 4, the bracket arm 66 abuts the first stop 74. Specifically, the first portion 68 of the bracket arm 66 abuts the first stop 74.

FIG. 5 illustrates the liftgate bracket 32 when the liftgate 14 is in the closed position. When moving from the fully open position of FIG. 4 to the closed position of FIG. 5, the bracket arm 66 travels through the entire range of movement R until it abuts the second stop 76.

Again, the strut 38 regulates movement of the ring 44, and in turn the liftgate 14. With reference to FIGS. 4-5, the strut 38 is connected to the ring 44 at the attachment point 78. The attachment point 78 is adjacent the bracket arm 66 in this example, but the attachment point 78 could be provided in other locations. The attachment point 78 is provided at a fixed location on the ring 44 such that linear movement of the strut 38 results in rotation of the ring 44.

Figure 6:
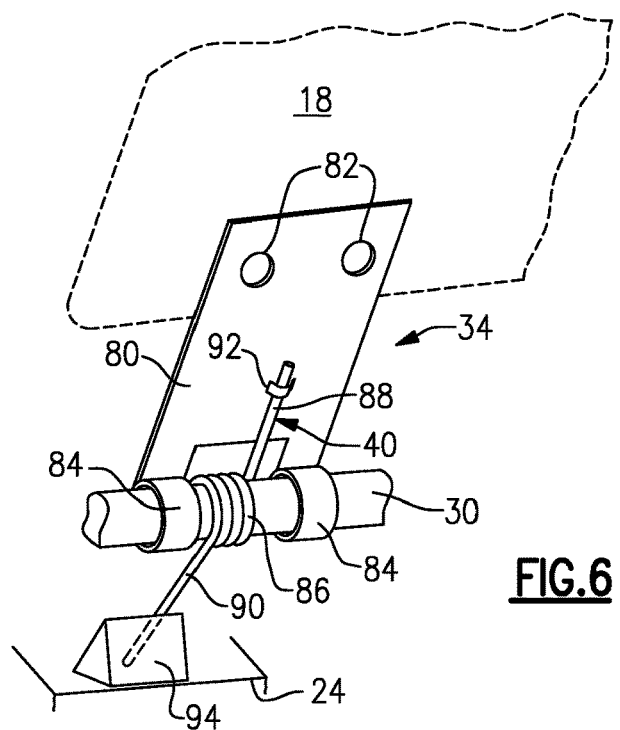
FIG. 6 is a perspective view of an example flipglass bracket.
Figure 7:
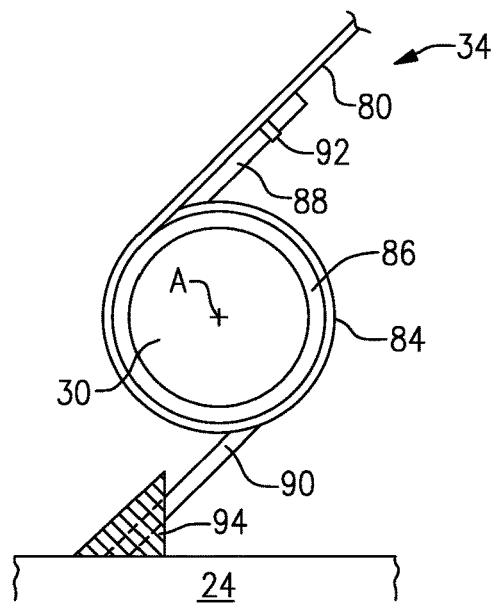
FIG. 7 is a side view of the example flipglass bracket of FIG. 6.

FIGS. 6 and 7 illustrate the detail of the flipglass bracket 34. In this example, the flipglass bracket 34 has a main body 80 with a plurality of apertures 82 for receiving fasteners that connect the flipglass bracket 34 to the flipglass window 18. This disclosure is not limited to fasteners, and other attachment methods, such as bonding, come within the scope of the disclosure. Opposite the apertures, a plurality of loops 84 project from the main body 80. The loops 84 are provided about the shaft 30 and allow the flipglass bracket 34 to rotate about the shaft 30.

Rotational movement of the flipglass bracket 34 about the shaft 30 is regulated, in this example, by the torsion spring 40. The torsion spring 40 includes a core 86 having a plurality of turns about the shaft 30. The torsion spring 40 further includes first and second legs 88, 90 projecting from the core 86. The first leg 88, in this example, is connected to the main body 80 by way of a loop 92. The second leg 90 projects from the core 86 in a direction generally opposite the first leg 88, and is connected to the vehicle body 16 by way of a projection 94. The projection 94 may include a loop or other type of retention mechanism, and may be integrally formed with the horizontal frame member 24.

The torsion spring 40, in this example, is biased to urge the flipglass window 18 into a fully open position. The properties of the torsion spring 40 are selected such that the flipglass window 18 opens under the bias of the torsion spring 40 at a desired speed, and such that a user can relatively easily overcome the force of the torsion spring 40 when closing the flipglass window 18. Accordingly, there is no need for struts to be connected to the flipglass window 18 or flipglass bracket 34.

As noted, the liftgate assembly of FIG. 2 includes first and second rotation assemblies 26, 28. While the above-discussion focuses on the first rotation assembly 26, it should be understood that the second rotation assembly 28 is arranged in substantially the same way as the first rotation assembly 26. For example, the liftgate 14 is rotatably connected to a liftgate bracket 32 of the first rotation assembly 26 and a corresponding liftgate bracket 32' of the second rotation assembly 28. The liftgate bracket 32' of the second rotation assembly 28 is also coupled to a strut at its outer face, in the same way as the liftgate bracket 32. Additionally, the flipglass window 18 is rotatably connected to the flipglass bracket 34 of the first rotation assembly 26 and a corresponding flipglass bracket 34' of the second rotation assembly 28. In the second rotation assembly 28, the liftgate bracket 32' and flipglass bracket 34' are rotatably connected to a second shaft 30', which is arranged in the same way as the shaft 30, and is disposed about the same axis A as the shaft 30. The first and second rotation assemblies 26, 28, may be manufactured as stand-alone units that are mounted to a vehicle as one-piece, which reduces assembly time.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle liftgate assembly, comprising:
a vehicle body;
a liftgate bracket;
a liftgate rotatably mounted to the vehicle body by way of the liftgate bracket;
a strut connected to the liftgate bracket to regulate rotational movement of the liftgate bracket;
wherein the liftgate bracket includes a bearing rotatable about a shaft, the bearing including a ring provided within a housing and disposed about the shaft, the ring being rotatable relative to the housing and the shaft; and
wherein the strut is connected directly to an outer face of the ring.

2. The assembly as recited in claim 1, wherein the liftgate bracket includes a first bearing bed and a second bearing bed, the first bearing bed provided between the ring and the housing, and the second bearing bed provided between the ring and the shaft.

3. The assembly as recited in claim 1, wherein the liftgate bracket includes a bracket arm projecting from the ring, wherein the bracket arm is connected to the liftgate.

4. The assembly as recited in claim 1, wherein:
the liftgate includes a flipglass window,
the liftgate assembly further comprises a flipglass bracket connected to the flipglass window, and
the flipglass bracket is rotatably mounted about the shaft.

5. The assembly as recited in claim 4, further comprising a torsion spring disposed about the shaft and connected to the flipglass bracket, the torsion spring regulating rotation of the flipglass bracket.

6. The assembly as recited in claim 4, wherein:
the liftgate bracket is a first liftgate bracket and the flipglass bracket is a first flipglass bracket,
the first liftgate bracket and the first flipglass bracket provide a first rotation assembly, and
the liftgate assembly includes a second rotation assembly having a second liftgate bracket and a second flipglass bracket rotatably connected to the liftgate and the flipglass window, respectively.

7. The assembly as recited in claim 6, wherein the second liftgate bracket and the second flipglass bracket are rotatably mounted about a second shaft.

8. The assembly as recited in claim 6, wherein a second strut is connected to the second liftgate bracket to regulate rotational movement of the second liftgate bracket.

9. The assembly as recited in claim 1, wherein the shaft is connected to the vehicle body by a mount.

10. The assembly as recited in claim 1, wherein the strut is mounted substantially within the vehicle body such that the strut is substantially not visible from a vehicle exterior.

11. The assembly as recited in claim 1, wherein the liftgate is a liftgate of a sport utility vehicle (SUV).

12. A vehicle liftgate assembly, comprising:
a vehicle body;
a liftgate bracket;
a liftgate rotatably mounted to the vehicle body by way of the liftgate bracket;
a strut connected to the liftgate bracket to regulate rotational movement of the liftgate bracket;
wherein the liftgate bracket includes a bearing rotatable about a shaft, the bearing including a ring provided within a housing and disposed about the shaft, the ring being rotatable relative to the housing and the shaft;
wherein the liftgate bracket includes a bracket arm projecting from the ring, wherein the bracket arm is connected to the liftgate; and
wherein the housing includes an opening, the bracket arm projecting through the opening.

13. The assembly as recited in claim 12, wherein:
the housing includes a first stop and a second stop,
the first and second stops are provided on opposite sides of the opening,
the bracket arm abuts the first stop when the liftgate is in a fully open position, and
the bracket arm abuts the second stop when the liftgate is in a closed position.

* * * * *